W. A. PARISH.
SPRINKLER.
APPLICATION FILED APR. 18, 1913.

1,082,437.

Patented Dec. 23, 1913.
2 SHEETS—SHEET 1.

Witnesses

Inventor
William A. Parish
By Victor J. Evans.
Attorney

W. A. PARISH.
SPRINKLER.
APPLICATION FILED APR. 18, 1913.

1,082,437.

Patented Dec. 23, 1913.

2 SHEETS—SHEET 2.

Witnesses
Wm. H. Mulligan.

Inventor
William A. Parish.
By Victor J. Evans.
Attorney

UNITED STATES PATENT OFFICE.

WILLIAM ALBERT PARISH, OF LA SALLE, COLORADO.

SPRINKLER.

1,082,437.　　　Specification of Letters Patent.　　Patented Dec. 23, 1913.

Application filed April 18, 1913. Serial No. 761,979.

*To all whom it may concern:*

Be it known that I, WILLIAM A. PARISH, a citizen of the United States, residing at La Salle, in the county of Weld and State of Colorado, have invented new and useful Improvements in Sprinklers, of which the following is a specification.

An object of the invention is to provide a sprinkler for use in irrigating and sprinkling.

The invention embodies, among other features, a vehicle body provided with a suitable tank and adapted to be moved over the ground, suitable means being provided and coöperating with the running gear of the vehicle for mixing the contents of the tank, hose members having connection with the tank and provided with suitable nozzles or other spraying means whereby the contents of the tank can be suitably sprayed or sprinkled upon the ground or on any vegetation growing thereon.

Figure 1:
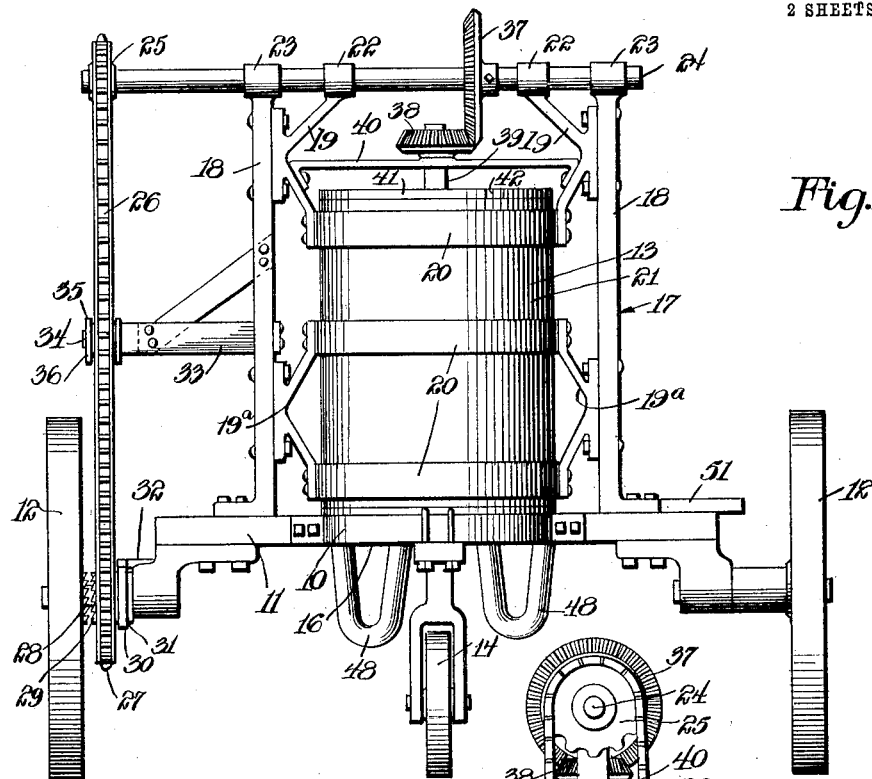
Figures 2, 5:
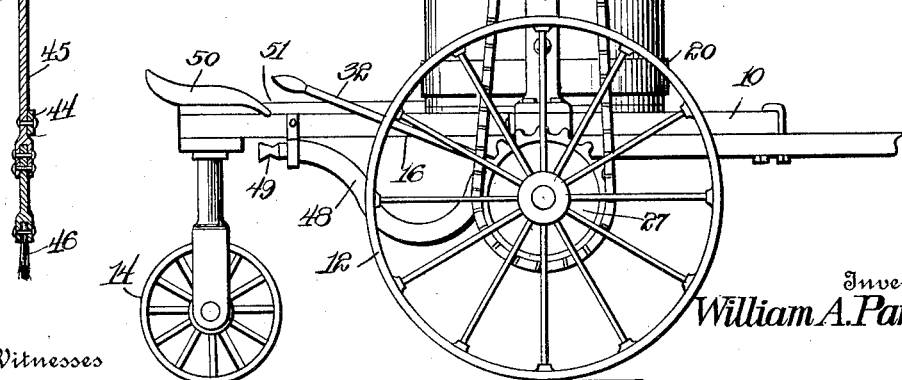
Figure 4:
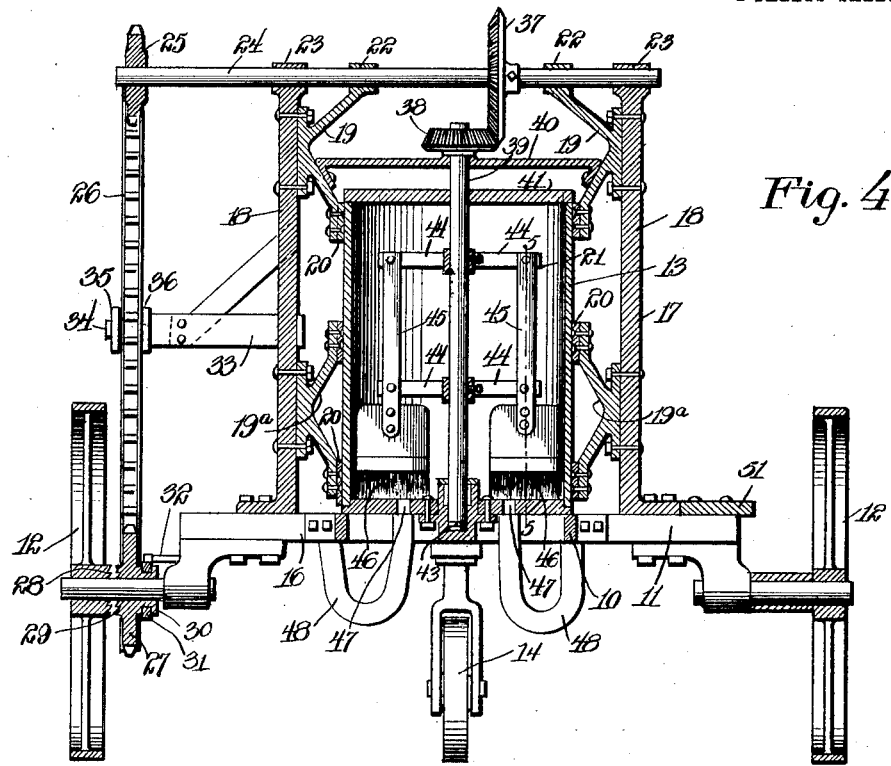
Figure 3:
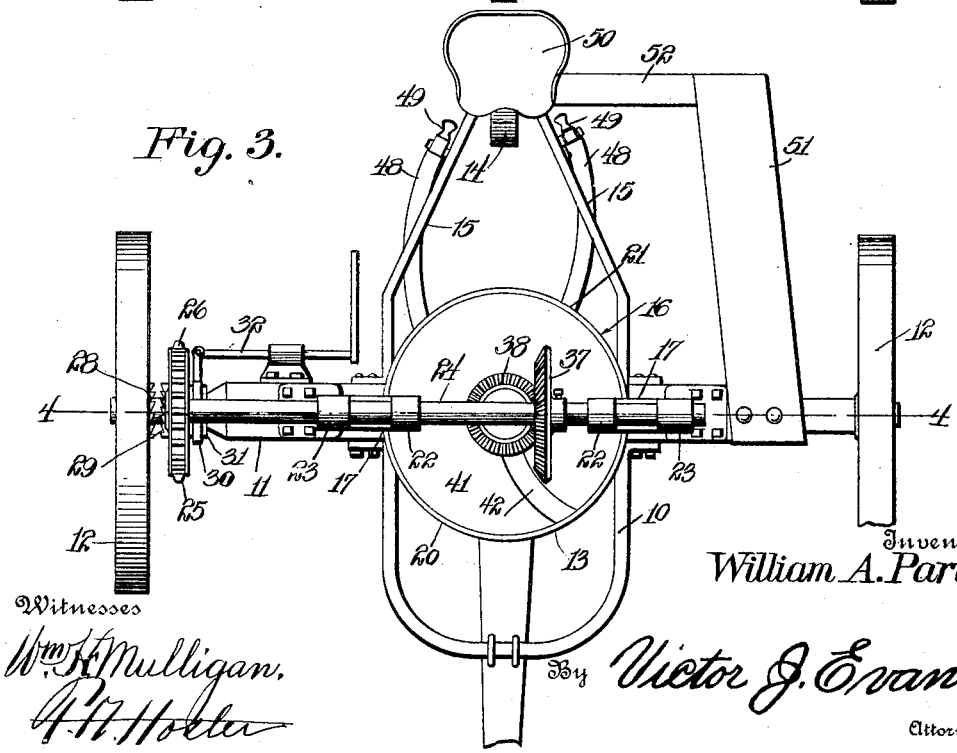

In the further disclosure of the invention reference is to be had to the accompanying drawings constituting a part of this specification, in which similar characters of reference denote corresponding parts in all the views, and in which:

Figure 1 is a front elevation of the sprinkler; Fig. 2 is a side elevation; Fig. 3 is a plan view, the cover for the tank being shown in open position; Fig. 4 is a vertical sectional view taken on the line 4—4 in Fig. 3; and Fig. 5 is a vertical sectional view taken on the line 5—5 in Fig. 4, showing the detail construction of one of the paddles.

Referring more particularly to the views, use is made of a horizontal U-shaped frame 10 on which is journaled a transversely extending axle 11 having wheels 12 secured to the ends thereof, a tank 13 being secured to the forward end of the U-shaped frame 10 and extending forwardly from the frame, a caster wheel 14 being arranged to swing on brackets 15 extended rearwardly from the rear end of the U-shaped frame 10 and constituting, together with the frame 10, axle 11, wheels 12 and tongue 13, a vehicle body 16.

A tank frame 17 is secured to the U-shaped frame 10 and extends vertically therefrom, the said tank frame consisting of uprights 18 having brackets 19, 19ª secured to the inner sides thereof, supporting bands 20 being secured to the brackets 19, 19ª and adapted to encircle a tank 21 mounted on the U-shaped frame 10, as shown. The upper ends of the brackets 19 terminate in journal boxes 22 and similar journal boxes 23 are provided on the upper ends of the uprights 18, a horizontal shaft 24 being journaled in the journal boxes 22, 23 and arranged horizontally relatively to the uprights 18. A toothed wheel 25 is keyed to an end of the shaft 24 and a chain 26 is passed over the said toothed wheel, the said chain being passed over a second toothed wheel 27 mounted to slide on the axle 11, adjacent one of the wheels 12, a toothed member 28 being secured to the shaft and adapted to be engaged by a clutch member 29 on the toothed wheel 27 to lock the toothed wheel 27 to the axle 11, thus resulting in rotation of the shaft 24 when the vehicle body 16 is moved over the ground, as will be readily understood. A grooved hub 30 is provided on the inner side of the toothed wheel 27 for the purpose of sliding the clutch member 29, on the axle, into or out of engagement with the toothed member 28, the said hub being provided with a collar 31, encircling the axle 11, and having pivotal connection with one end of a clutch lever 32 of the bell crank type, the said clutch lever being mounted to swing on the frame 10 of the vehicle body 16. A slotted bracket 33 is secured to one of the uprights 18 of the tank frame 17, and extending through the slot thereof and adjustably mounted on the said bracket is a rod 34 arranged to extend horizontally and carrying a roller 35 on one end thereof, the said roller being journaled on the rod 34 and constituting a tightener 36 for the chain 26, the mentioned chain being passed over the said roller 35 in such a manner that when the rod 34 is adjusted on the bracket 33 the tension of the chain 26 can be conveniently increased or decreased, as will be readily understood by referring to the views.

Keyed to the shaft 24 is a beveled toothed wheel 37 in mesh with a beveled toothed wheel 38 keyed to a vertically extending paddle shaft 39 extending downwardly into the tank 21, the said paddle shaft being supported by suitable arms 40 extended horizontally from the uprights 18 of the tank frame 17. A cover 41 is provided for the tank 21 and is mounted to swing thereon, the said cover having a crescent shaped slot 42 therein and through which the paddle shaft 39 extends, it being thus seen that the cover 41 can be conveniently swung into open or closed position to entirely remove the cover from the tank 21.

The lower end of the paddle shaft 39 is journaled in a socket 43 secured to the inner side of the bottom of the tank 21, and secured to the paddle shaft and extending horizontally therefrom are arms 44 having rigidly secured thereto vertically extending paddle members 45, four paddle members being preferably provided and arranged at substantially right angles to each other, with two of the opposing paddle members 45 provided with suitable brushes 46 on the lower ends thereof, the said paddle members 45 constituting the mixing means for mixing the contents of the tank 21. Openings 47 are formed in the bottom of the tank 21 and hose members 48 are arranged to extend through the openings and project exteriorly of the tank, the free ends of the said hose members being provided with suitable nozzles 49 for the purpose of spraying the contents of the tank over the ground or upon any vegetation growing upon the ground.

A seat 50 is preferably mounted on the brackets 15 over the caster wheel 14 and a platform 51 is interposed between one of the wheels 12 and the tank 21, the platform having rigid connection with the U-shaped frame 10 at one end and having the other end thereof supported by a bracket 52 extended from the under side of the seat 50, the said seat 50 and platform 51 being provided for the purpose of carrying suitable operators on the vehicle body who handle the hose members 48 in order that the contents of the tank 21 may be properly sprinkled over the ground.

Now assuming that the clutch member 32 has been swung into closed position to key the toothed wheel 27 to the axle 11, when the vehicle body 16 is advanced along the ground, rotation will be imparted to the shaft 24 through the medium of the chain 26 and toothed wheels 25, 27, thus imparting rotation to the paddle shaft 39 through the medium of the beveled toothed wheels 37, 38, the rotation of the shaft 39 being adapted to in turn actuate the paddle members 45 within the tank 21 to properly mix the contents of the tank and prevent any sediment from forming or collecting on the bottom of the tank, the brushes 46 of the paddle members 45 being adapted to sweep the inner face of the bottom of the tank in their rotation, as will be readily understood.

It will be readily seen that by simply operating the clutch lever 32, the clutch member 29 can be thrown out of engagement with its coöperating member 28, thus permitting the wheel 27 to run loosely on the axle 11 without imparting any rotation to the paddle members 45 in the tank 21. It should be noted that the bracket 19 not only aids in supporting the tank 21 in vertical position, but also supports the shaft 24 which is journaled in the boxes 22 of the bracket 29 and the boxes 23 of the uprights 18.

By providing the swinging cover 41 and arranging the same in the manner mentioned, the tank 21 can be conveniently filled from the top without entirely removing the cover from the tank and the cover can be conveniently swung into closed position without interfering with the proper operation of the paddle members 45.

Having thus described my invention, I claim:

1. In a device of the class described, the combination with a vehicle body, of a tank frame thereon consisting of uprights secured to the vehicle body and extending vertically therefrom, brackets secured to the said uprights, bands on the said brackets, a tank supported on the said vehicle body and encircled by the said bands, a shaft journaled on one of the said brackets and the said uprights, a paddle shaft mounted to rotate in the said tank, means connecting the said paddle shaft with the first mentioned shaft for imparting rotation thereto when the first mentioned shaft is rotated, paddle members supported by the said paddle shaft and operable therewith, and a connection between the first mentioned shaft and the vehicle whereby the first mentioned shaft will be rotated when the said vehicle body is advanced along the ground.

2. In a device of the class described, the combination with a vehicle body, of a tank frame thereon consisting of uprights secured to the vehicle body and extending vertically therefrom, brackets secured to the said uprights, bands on the said brackets, a tank supported on the said vehicle body and encircled by the said bands, a shaft journaled on one of the said brackets and the said uprights, a paddle shaft mounted to rotate in the said tank, means connecting the said paddle shaft with the first mentioned shaft for imparting rotation thereto when the first mentioned shaft is rotated, paddle members supported by the said paddle shaft and operable therewith, a connection between the first mentioned shaft and the vehicle body whereby the first mentioned shaft will be rotated when the said vehicle body is advanced along the ground, and a cover provided with a crescent shaped slot and mounted to swing on the said tank to close the same, the said paddle shaft being extended through the slot in the said cover.

In testimony whereof I affix my signature in presence of two witnesses.

WILLIAM ALBERT PARISH.

Witnesses:
GEORGE C. BRIGGS,
CHAS. McKENNA.

Copies of this patent may be obtained for five cents each, by addressing the "Commissioner of Patents, Washington, D. C."